Nov. 5, 1957  R. CHARBONNIER ET AL  2,812,171
INTEGRATING SCALE FOR MATTERS CARRIED BY A CONVEYOR BELTING
Filed Jan. 10, 1955  5 Sheets-Sheet 1
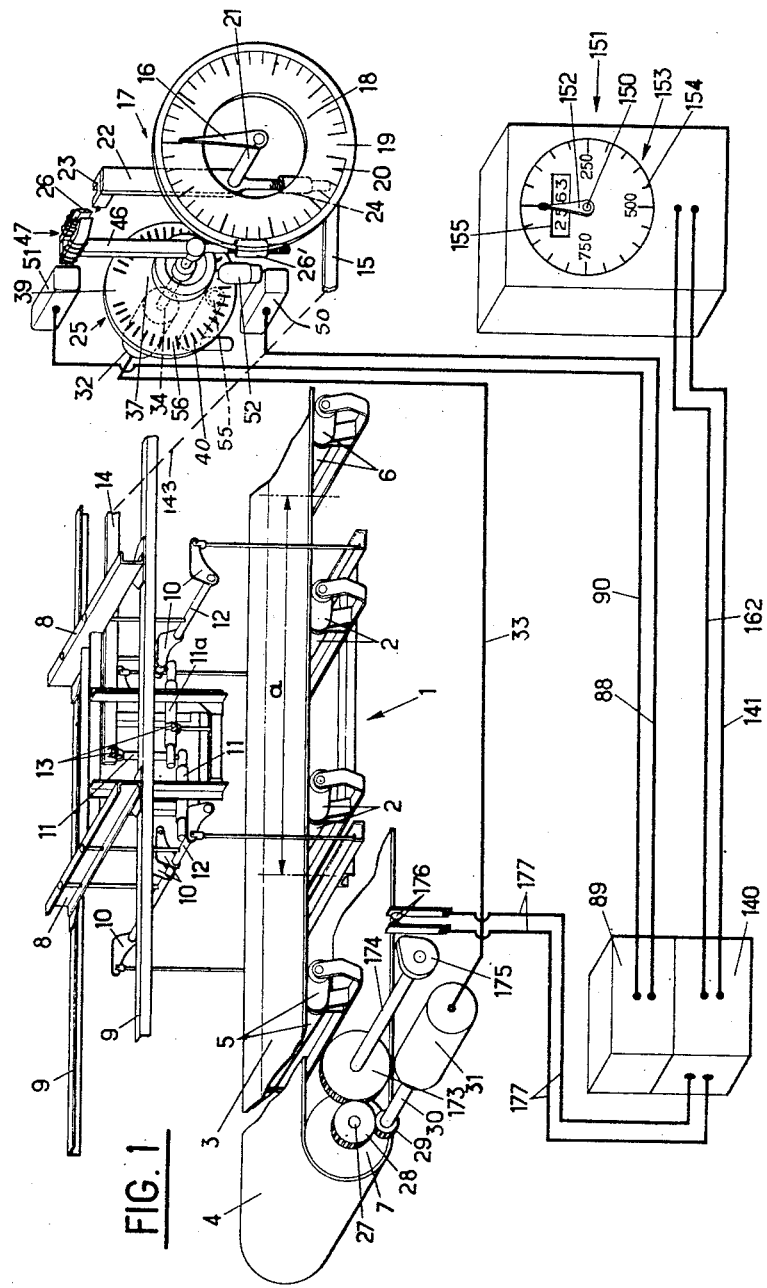
INVENTORS
ROGER CHARBONNIER AND
MAURICE DECALION
ATTORNEYS

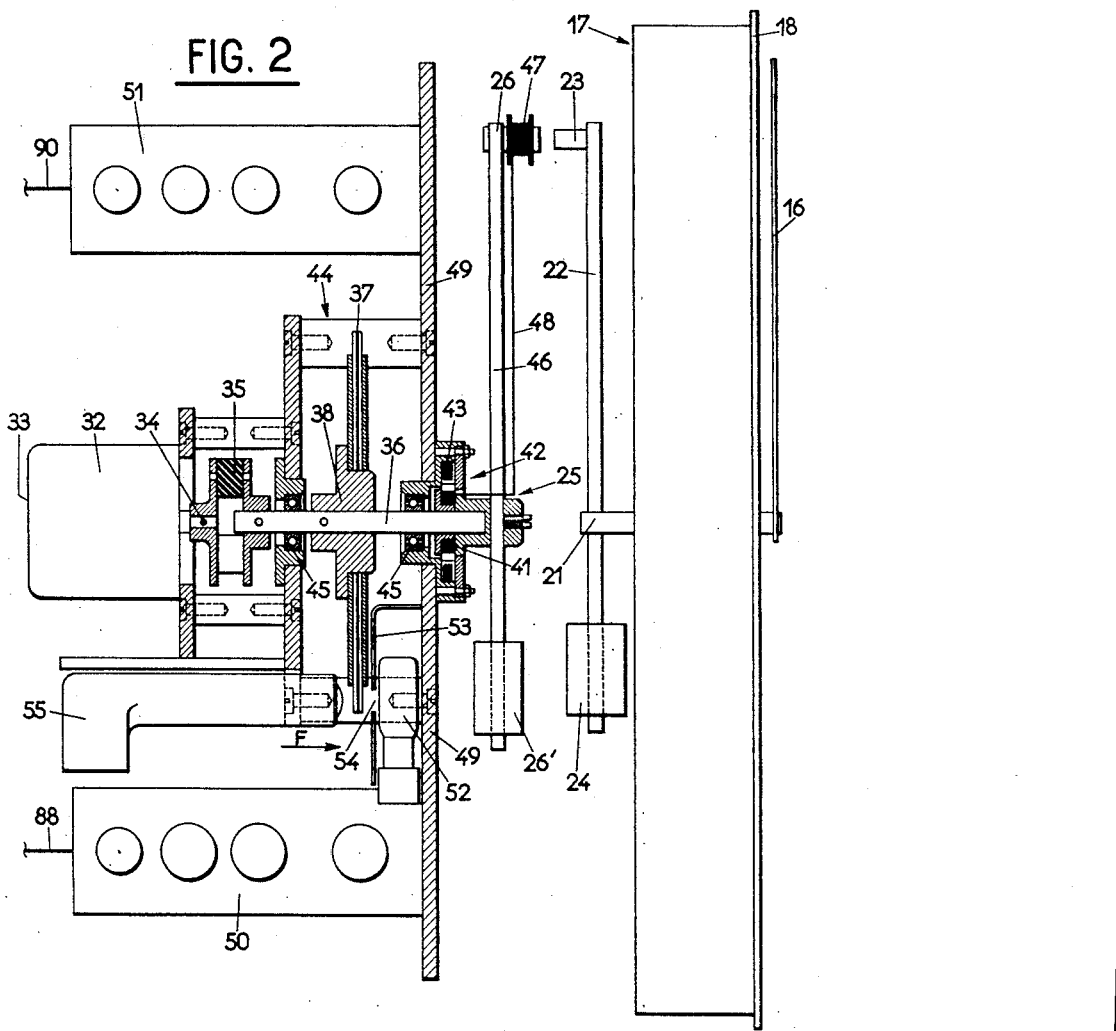
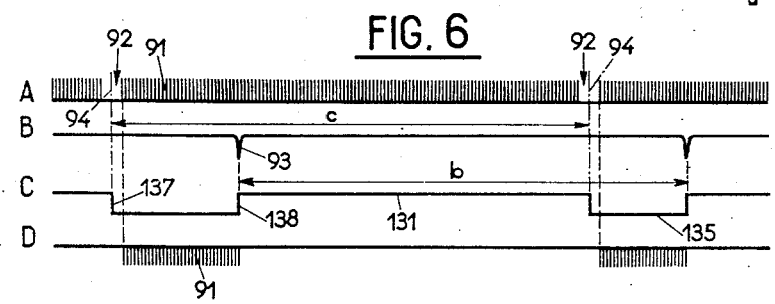

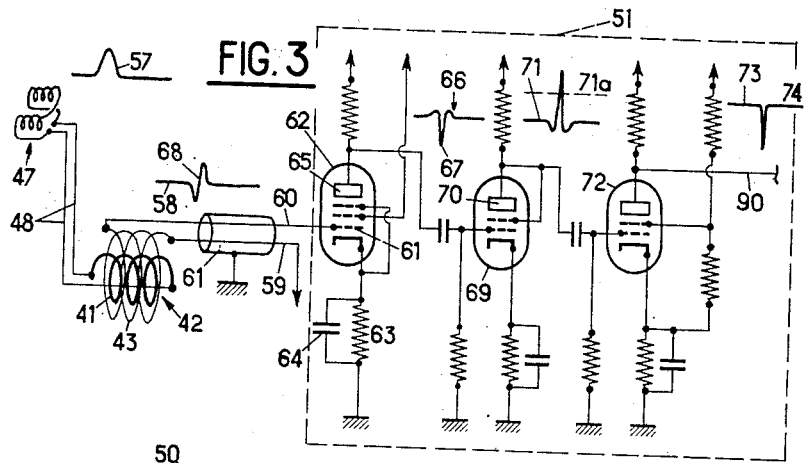
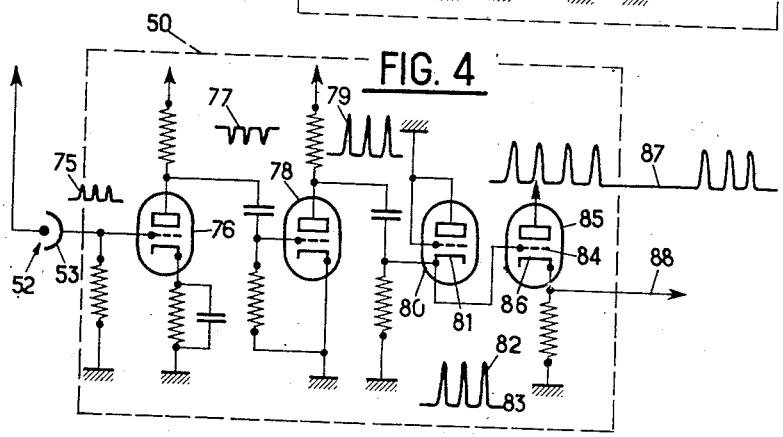
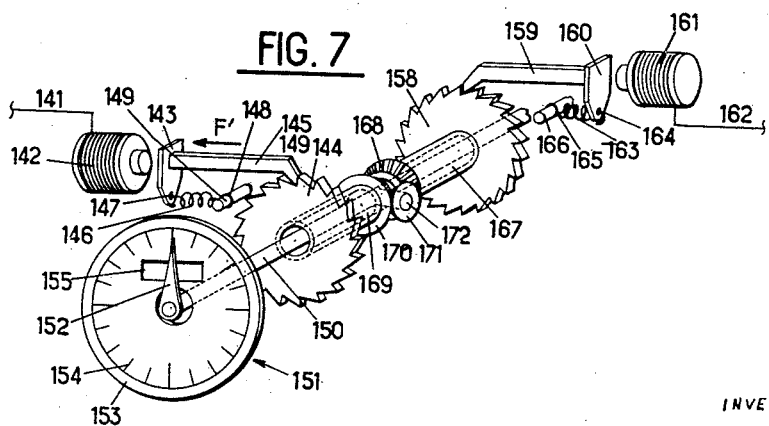

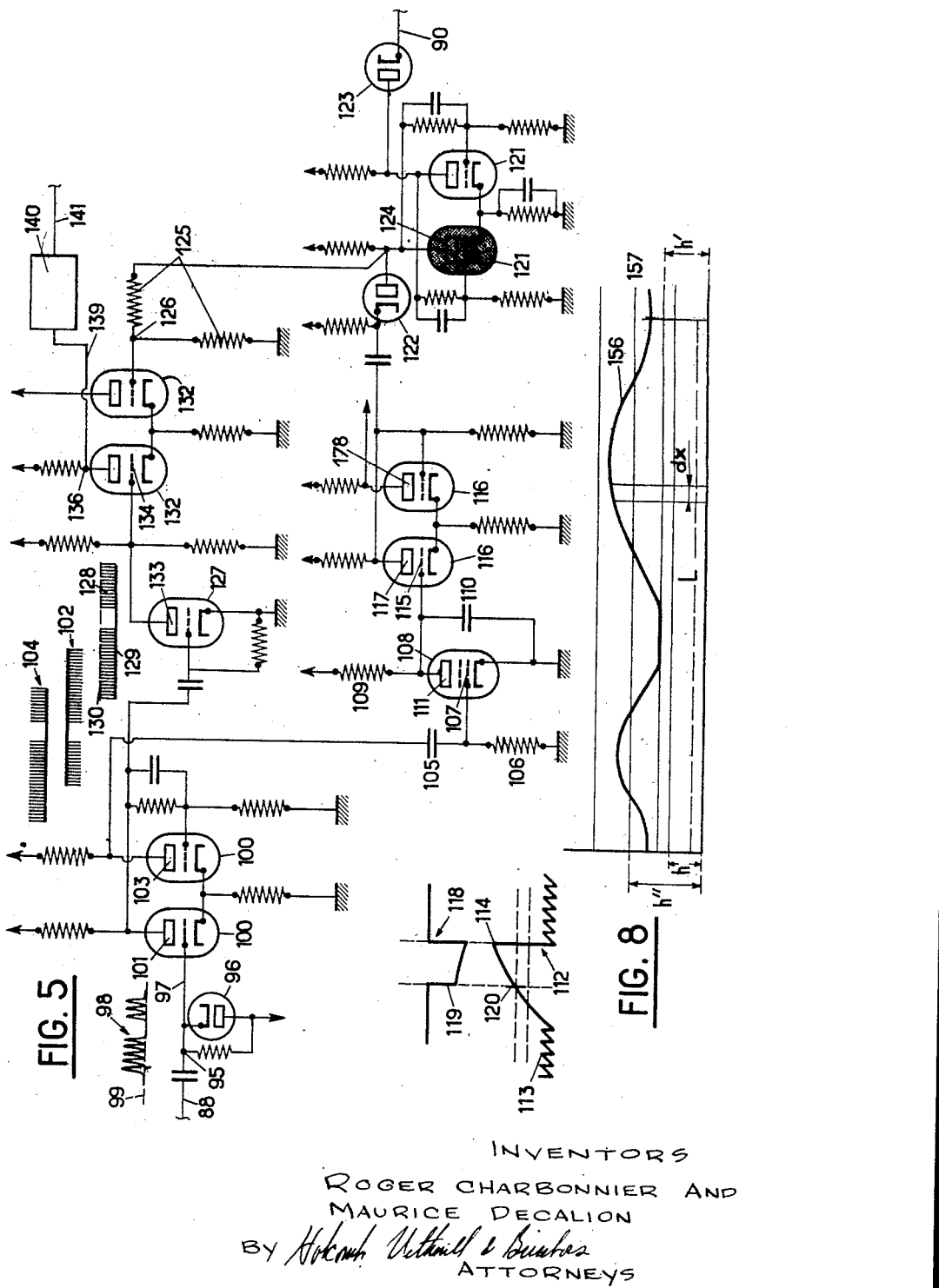

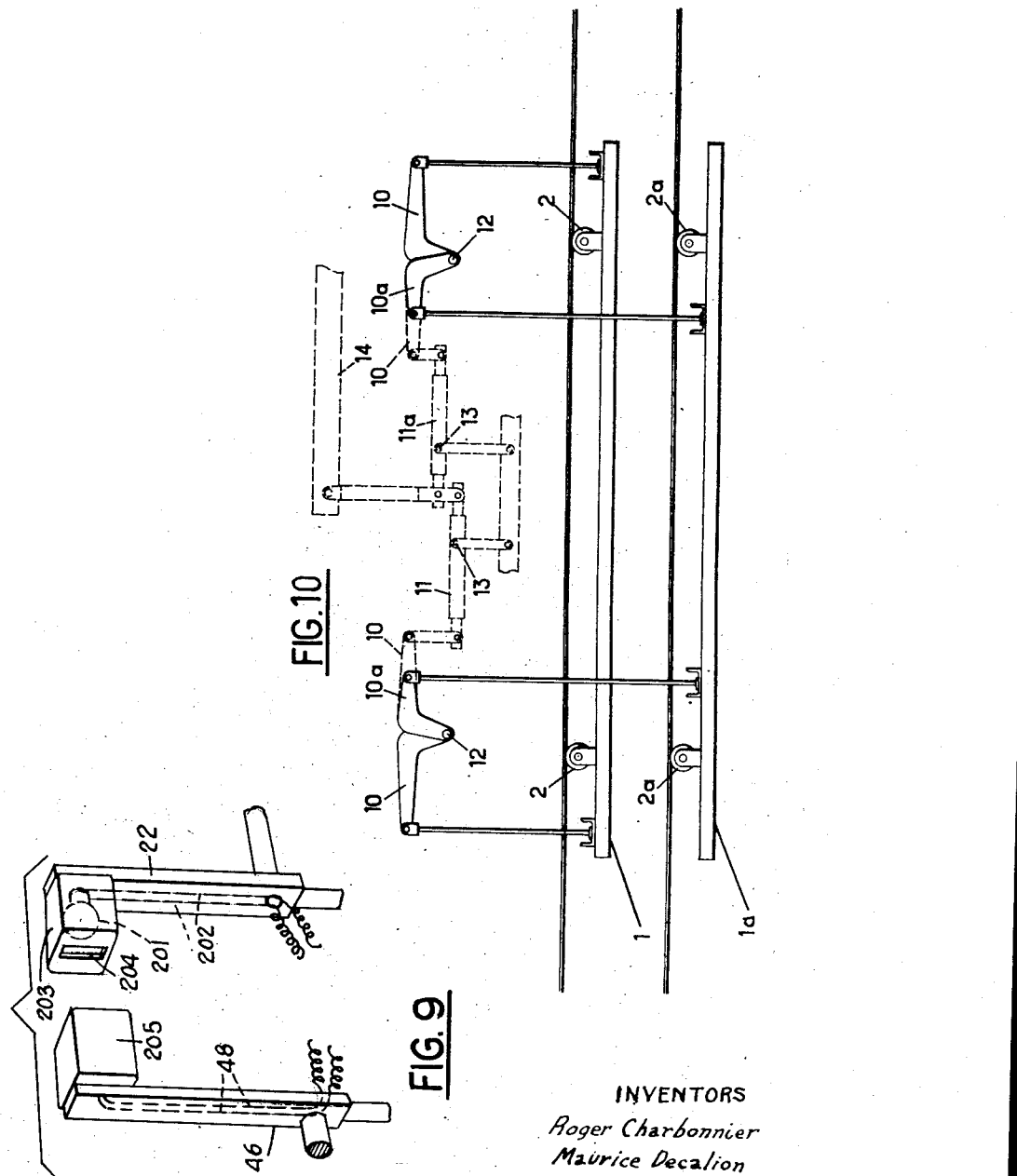

United States Patent Office 2,812,171
Patented Nov. 5, 1957

2,812,171
INTEGRATING SCALE FOR MATTERS CARRIED BY A CONVEYOR BELTING

Roger Charbonnier, Meudon-Bellevue, and Maurice Decalion, Paris, France, assignors to Rochar Electronique, Montrouge, France, and Societe a responsabilite limitee Etablissements Elwor, Courbevoie, France, both corporations of France Application January 10, 1955, Serial No. 480,928

Claims priority, application France January 12, 1954

18 Claims. (Cl. 265—28)

The present invention relates to an improved integrating scale which permits the material disposed on a portion of a conveyor belting to be weighed at very brief intervals; it is therefore possible to operate with our integrating scale on short portions of the conveyor belting and to ensure a great precision of the total weighing. The improved scale also performs the automatic integration or totalization of the successive weighings over a period of time.

Various types of scales operating on conveyor beltings are available, but these known scales work on relatively long portions of said belting. Their relative precision is reduced by reason of their dependence on mechanical parts, which prevents rapid weighing.

In known scales a long portion of the conveyor belting called "the weighing section" is connected, by means of a series of levers, to the beam of the scale and is tared; therefore the index-needle, indicating pointer, or any other indicating element of the scale displaced by the movement of said beam occupies at any moment a position which constitutes a measurement of the weight of the material which is carried by the "weighing section." At substantially regular intervals, equal, for example, to the time taken by a point on the conveyor belting to advance a distance equal to the length of the weighing section, an element cooperating with the scale and coming into physical contact therewith (although not integral with the scale) measures the displacement of the indicating pointer or element.

The known scales comprise generally a member occupying a position which depends on the weight of the material disposed on the weighing section and which is moved by the scale mechanism. This member has, for example, the shape of a cam and this cam-like member is brought, at regular intervals, into contact with elements which control the weight counter itself by means of a mechanism including mechanical parts such as rods, stems, toothed wheels or disks, which reciprocate and cannot therefore work at a high speed. All these measurements are cumulated over a period of time and their sum, brought to a convenient scale of notation, constitutes a measure of the weight of material delivered by the conveyor belting.

In French Patent No. 1,034,751, filed January 30, 1951, the "Etablissements Elwor" described a weighing and totalizing device of the above-mentioned type comprising an element consisting of a disk with alternate opaque and transparent zones having a circular reciprocating motion for transmitting the indications of the scale to a counting or integrating device.

The present invention is intended to prevent the major above-mentioned drawback i. e. the slowness of the transmission of the measurements from the weighing mechanism (scale) to the integrating mechanism (counters) due to the presence of mechanical reciprocating members.

It is therefore an object of the invention to provide an integrating scale having a very high working speed.

It is another object of the invention to provide an integrating scale without any physical contact between the weighing mechanism and the measurment transmitting and counting mechanism.

It is also an object of the invention to provide measurement transmitting mechanism for an integrating scale, said mechanism comprising elements having a continuous rotational movement.

It is still another object of the invention to provide a measurement transmission mechanism, for an integrating scale, comprising means for photo-electrically or electromagnetically transmitting towards the integrating mechanism or counters the necessary information or intelligence indicating the quantity of material delivered by the conveyor belting.

It is another object of the invention to electrically transmit an indication of the displacement of said belting to the rotating measurement transmitting mechanism.

It is also an object of the invention to provide an integrating scale including a taring or compensating device which subtracts from the total weight integrated during a complete revolution of the conveyor belt the actual weight or tare of said belt, while preventing the irregularities of weight per unit length of said belting from causing the indicating needle of the scale to leave the measuring zone of the dial of said scale and fall below zero due to motion of said belting when no material is being carried thereon.

It is another object of the invention to provide means for mechanically taring, at each moment, a constant weight lower than the minimum weight of the weighed portion of the conveyor belting and means for electrically taring on the electronic counters, at corresponding intervals, the integrated difference between the mean or average value of the weighed portion of the conveyor belting and the mechanically tared constant weight.

In one embodiment of the invention, the indication of the output or weight carried by the belting is read on a counter driven by a couple of step-by-step motors which may rotate in both directions: a first motor is driven in one direction by an electronic computing device receiving information from the measurement transmitting mechanism and a second motor is driven in the opposite direction by electric pulses, the number of which is proportional to the length of the belting which has been weighed, said pulses arriving from the complementary taring device.

Therefore an integrating scale according to the invention takes account of the total weight (less the constant mechanical tare) of the weighing section at a high speed, rapidly cumulates the indications of the weighing mechanism, while avoiding the use of any mechanical reciprocating member and any physical contact between the weighing mechanism and the measurement transmitting mechanism thereby permitting the use of a short weighing section and the production of a small and relatively cheap apparatus, and subtracts the cumulated difference between the mean value of the weighed portion of the conveyor belting and the mechanical tare.

The aforesaid and other objects, features and advantages of the invention will be more easily and fully understood from the illustration of one embodiment of an integrating scale according to the invention, being understood that the invention is not restricted to the details of the illustrated and described embodiment but that it is susceptible to modifications and adaptations.

In the attached drawings:

Fig. 1 is a perspective view of an integrating scale according to the invention, but in order to reduce the size of the drawing the relative dimensions of the various components are not shown in their proper proportions;

Fig. 2 is an axial section of the weighing or measuring mechanism showing the essential parts thereof;

Fig. 3 is a diagrammatic representation of a deriving, amplifying and crest-suppressing assembly for the signals generated by the passage of a couple of continuously rotating coils in front of a magnet rotating with the pointer of the scale;

Fig. 4 shows diagrammatically the electrical circuitry of the amplifier for the voltage generated by the photoelectric cell disposed behind the measuring mechanism;

Fig. 5 is a diagrammatic view of the circuitry of the selector, i. e. the device allowing the selection and computing of the pulses generated by the photo-electric cell and corresponding to the weights to be integrated;

Fig. 6 shows oscillographic representations of the main electrical pulses or voltages allowing the transmission of the indications towards the electronic calculating device and the counters;

Fig. 7 represents the final counter receiving the control pulses from the electronic counters of Fig. 5;

Fig. 8 shows a curve representing the variations of the unitary weight of the belting plotted against the length of said continuous belting;

Figure 9 is a fragmentary elevational view showing an alternative construction in which the arms 46 and 22 carry a photo-electric cell and an illuminating device respectively, instead of a coil and magnet; and Figure 10 is a schematic front elevation showing mechanical taring means for the scale.

Reference is first made to Fig. 1. The scale itself of known type comprises a frame or structure 1 supporting perfectly rectified rollers 2 (e. g. two sets of rollers) called "weighing rollers" on which is disposed the weighing section or portion 3 (having a length $a$) of the conveyor belting 4 also disposed on other rollers (only the two neighboring rollers 5 and 6 having been shown on Fig. 1) and driven by a driving roller 7.

The frame 1 is supported from small transverse beams 8, which rest on beams 9, through a set of levers 10 and 11 fulcrumed on rods 12 and 13, this set transmitting the vertical movement of frame 1 to a lever 14 which, in its turn, transmits said movement by levers (schematically illustrated by the broken line 143) to a lever 15 controlling the angular displacement of pointer 16 of the indicating head 17 in front of the graduated dial 18. Said dial 18 comprises, as in the known scale dials, a blank zone 19 without graduations (extending through an angle of $m$ degrees) and $n$ equidistant graduations 20. For example, the dial 18 may comprise 1000 graduations ($n$=1000) and the blank zone occupy an angle of 15° ($m$=15).

The angular displacement of pointer 16 from the reference or rest position thereof (graduation "zero") is proportional (without considering the mechanical taring of the scale) to the weight supported by the frame 1 i. e. substantially proportional to the total weight of the portion 3 of belting (of length $a$) if said portion is substantially uniformly loaded.

The scale itself is of course of a type adapted to the load to be weighed which is relatively small due to the shortness of the weighing section (e. g. about 5 to 7 feet).

The mechanical taring is accomplished in the known manner for the scales of such type, but according to a feature of the invention the weight of the weighing section (of length $a$) is only partly tared: the mechanical tare is equal to a weight less than the minimum weight of said weighing leaf (the weight of the weighing portion of the belting varying from time to time). According to this feature, the pointer 16 never falls below the "0" graduation when the belting travels without carrying any load.

In a modification of the invention, it is possible to provide a single weighing set of rollers 2 carried by a stirrup-piece or brace and disposed between conventional rollers 5 and 6, the vertical displacement of said set of rollers 2 being transmitted by means of a set of levers to pointer 16.

As shown in Figure 10, it is also possible to provide at least one roller 2a for weighing the tare, i. e., a portion of the returning conveyor belt having the same length as the weighing section, said at least one roller being free to move vertically and being carried by a frame or brace 1a which is supported from the set of levers 10 in the same manner as the frame 1 by means of an additional lever 10a which extends from the fulcrum rod 12 in the opposite direction from the corresponding lever supporting the frame 1 in order to accomplish the subtraction of the weight of the weighed portion of the returning conveyor belt from the total weight of the weighing section, i. e., the tare of the belting 4.

But this taring process includes some drawbacks due essentially to the fact that the returning portion of the belt rests with its dirty side (the carrying side) on said at least one roller for weighing the tare, thereby rapidly destroying the original precision thereof. Due to the dirt accumulating on the taring rollers, these rollers cannot be considered as being in the same plane after some time has passed. Therefore, according to a feature of the invention, the taring is partially accomplished by a mechanical taring provided on the scale proper as above-mentioned and partially by complementary taring as mentioned hereinafter.

It has already been mentioned that in the known devices the measuring of the displacement of pointer 16 at regular intervals, corresponding e. g. to the duration of an advancement of length $a$ of the conveyor belting, is effectuated by mechanical members having a reciprocating movement and coming in physical contact with the weight-indicating elements of the scale.

According to an essential feature of the present invention, the indications of pointer 16 are transmitted by continuously rotating members which have no physical contact with the scale proper.

Therefore the indicating head 17 of the scale (Figs. 1 and 2) comprises, secured on shaft 21 of pointer or needle 16 (e. g. in the same radial plane as said pointer), an arm 22 carrying a small horse-shoe magnet 23 the assembly consisting of the arm 22 and magnet 23 being counterbalanced by counterweights 24. The angular position of arm 22 is the same as that of the second pointer in a scale having two faces. The purpose of the magnet 23 is to allow the transmission over a certain distance, without any physical contact, of the indications of the scale which can be read on the dial 18, as the angular displacement of magnet 23 (from its rest position corresponding to the rest position of pointer 16 before the graduation "0") is proportional to the weight of the material on the weighing section 3 (not taking account of the tare).

The locating or ranging of magnet 23 is performed by means of a rotating device 25 which will be hereinafter described in detail and which is driven from one of the rollers supporting the belting 4, preferably the driving roller 7. On the shaft 27 of roller 7 is keyed a toothed-wheel 28 cooperating with a toothed-wheel 29 keyed on the shaft 30 of a synchronizing motor 31 (selsyn or transyn motor). Said motor 31 is therefore driven at a speed (e. g. about 10 revolutions per second) proportional to the rotation speed of shaft 7 and therefore to the advancement speed of belting 4, a complete revolution of motor 31 corresponding to the advancement of a predetermined portion of the belting 4.

A synchronizing receiving motor 32 (transyn or selsyn motor), which is connected by a set of leads (three synchronizing leads and generally two power leads) to motor 31, constitutes with said motor 31 a pair of synchronized motors rotating at the same speed.

It would of course be possible to substitute a mechanical transmission by means of shafts and gears for the electrical transmission by means of motors 31 and 32 and leads 33, but an electrical transmission is much more flexible.

Shaft 34 of motor 32, which performs several complete revolutions for each advancement of $a$ of belting 4, drives, through a flexible coupling 35, a shaft 36 on which are secured the following elements:

A disk or plate 37 carried by a socket 38, said disk being a negative reproduction of the graduated dial 18 of indicating head 17 and comprising therefore, at least on its periphery, a blank zone 39 embracing an angle of $m$ degrees (equal to the angle embraced by blank zone 19 of dial 18) and a graduated zone comprising $n$ regularly spaced photon-permeable indicia, e. g. slots or transparent zones 40 ($n$ being the number of graduations of dial 18), said slots or transparent zones 40 corresponding to the bars of the graduation of dial 18; disk 37 may, for example, be of the type described in above-mentioned French Patent No. 1,034,751, i. e. may consist of a photographic film including on the periphery thereof alternate transparent and opaque zones;

The primary winding 41 of the transformer 42, the secondary winding 43 thereof being stationary and disposed around said primary 41. The secondary winding 43 is disposed in a casing 44 wherein are located the bearings 45 in which shaft 36 rotates;

An arm 46 terminating in a fork 26 carrying one induction coil or preferably a couple of induction coils 47 connected by leads 48 to the primary winding 41 of transformer 42, these coils 47 being the center of an induction phenomena at each revolution of motor 32 when they pass in front of magnet 23 and the voltage induced in these coils 47 being transmitted, without friction and without brushes, by means of transformer 42, to the stationary secondary winding 43 thereof; arm 46 carries preferably a counterweight 26' for balancing the weight of fork 26 and coils 47.

Casing 44 comprises a flange 49 which supports two amplifiers 50 and 51 which will be described thereinunder with reference to Figs. 4 and 3 respectively.

Amplifier 50 carries a photo-electric cell 52 partially covered by a mask 53 in which is provided an aperture 54 disposed in front of the lower portion of disk 37, i. e. in front of the slots or transparent zones 40 which pass in front of said aperture during the rotation of said disk. The photon-permeable zones 40 allow the passage, in the direction of arrow F, of the light rays emitted by a lighting device 55, constituted e. g. by a conventional cinematographic sound track reading device, and the photon-opaque zones 56 separating the photon-permeable zones 40 stop the travel of said light rays in the direction of arrow F. According to this arrangement photo-electric cell 52 generates a voltage each time that a photon-permeable zone 40 passes in front of aperture 54.

As above-mentioned, shaft 36 carries an arm 46 terminating in a fork 26 on which is disposed a couple of induction coils 47. Reference being now made to Fig. 3 it will be explained how the variations of magnetic flux generated by the rotation of coils 47 are used to create calibrated pulses each time that the coils 47 pass in front of magnet 23.

Both coils 47 carried by fork 26, which pass once for each revolution of disk 37 in front of magnet 23, are inversely connected and are traversed by opposite fluxes. This disposition prevents the assembly of both coils 47 from coming under the influence of any stray magnetic fluxes. The coils 47 are connected as above-mentioned by means of leads 48 to the rotary primary winding 41 of a transformer 42 having a stationary secondary winding 43. The voltage collected at the secondary winding 43 is a faithful reproduction of the detected voltage and is the derivative of flux 57 as a function of time. This voltage is represented by curve or wave 58.

The input of secondary winding 43 is connected to a fixed positive potential e. g. +50 volts; the lead 59 connecting said winding 43 to the fixed potential and the output lead 60 of said winding are shielded by a grounded screen 61. The terminal of lead 60, i. e. the output of the secondary winding 43, is connected to the control grid 61 of pentode tube 62 which has a cathode load comprising a resistor 63 of high resistance (e. g. 10,000 ohms) disposed in parallel with a condenser 64 designed to allow the passage through said pentode 62 of a current proportional to the derivative of curve or wave 58 as a function of time. On the anode 65 of pentode 62 is generated a voltage 66 having a short negative peak 67 corresponding to the rapid rise 68 of curve 58. The voltage 66 is amplified by amplifying tube 69 which inverts the polarity thereof; on anode 70 is generated voltage 71 which is applied to the tube 72 normally blocked by cathodic bias. The output voltage 73 of tube 72 comprises therefore short pulses which are negative with respect to the open circuit voltage 74 fed to the tube 72 which plays the part of an overdriven amplifier clipping off the crest of voltage 71 above the dotted line 71$a$.

In brief, the assembly 51, shown only by a block on Fig. 2, includes essentially a differentiating tube 62, an amplifying tube 69 and a crest-suppressing tube 72. This assembly receives wave 58 and transmits wave 73. This wave 73 is shown on Fig. 6 as wave B.

When describing Fig. 2 the presence of a second set of tubes, i. e. set 50 amplifying the voltages generated by cell 52, was indicated. The amplifier 50 is relatively conventional and is shown on Fig. 4. The output voltage of photo-electric cell 52 is picked up on its cathode 53 and the passage of a slot or transparent zone 40 of disk 37 corresponds therefore to a positive pulse of voltage, the succession of pulses being shown as wave 75. The voltage 75 is first amplified by tube 76 and becomes voltage 77, then amplified by tube 78 and becomes finally voltage 79 which is leveled at the ground potential by tube 80: on the cathode 81 of tube 80 are generated pulses shown on curve 82, the pedestal 83 of curve 82 being at the ground potential.

The pulses shown on wave 82 are then applied on grid 84 of cathodically coupled triode 85 which serves as a "cathode follower." On cathode 86 of triode 85 is therefore generated a voltage 87 (also represented on Fig. 6 by curve A) which is delivered by lead 88 to a selector which also receives by lead 90 the voltage 73 from amplifier 51, and will be described with reference to Fig. 5.

On Fig. 6 is shown, as above mentioned, curve A indicating the variations of the voltage generated by amplifier 50 and corresponding to the variations of the voltage emitted by photo-electric cell 52 when disc 37 rotates. On said wave A are shown the substantially equidistant calibrated pulses 91 corresponding to the passage of a slot or transparent zone 40 (the pulses 91 would be perfectly equidistant if the driving shaft 27 rotated at a perfectly constant speed) and the zone 92 corresponding to the passage of the blank zone 39 of disk 37 in front of aperture 54.

On the same figure the wave B shows as hereinbefore indicated the pulses 93 generated in the secondary winding 43 of transformer 42 by the passage of coils 47 in front of magnet 23 for each revolution of disk 37 (generally the distance $b$ between two consecutive pulses 93 varies slightly, as this distance would be equal to the substantially constant distance $c$ separating the centers 94 of two consecutive zones 92 of wave A only if magnet 23 had not moved, i. e. if the weight measured by the integrating scale had not changed).

The voltages A and B are respectively transmitted by leads 88 and 90 to selector or amplifier shown in Fig. 5. The object of this selector is to count, for each revolution of disk 37, the pulses 91 generated by photo-electric cell 52 between the passage of blank zone 39 in front of cell 52 (corresponding to the zones 92 of curve A) and the passage of coils 47 in front of magnet 23 (corresponding to the pulses 93 of curve B).

It is therefore necessary to provide means for blocking in selector 89 the transmission of pulses 91 of wave A after the emission of each pulse 93 of wave B and means for unblocking the transmission of pulses 91 after each passage of blank zone 39 in front of cell 52 (zone 92 of wave A).

In the selector, which will be now described with reference to Fig. 5, the blocking and unblocking means comprises an Eccles-Jordan trigger.

The photo-electric voltage 87 (shown also as wave A on Fig. 6) arrives through lead 88 to point 95 and is applied, through a restitution diode 96, to point 97, the potential of which, represented by wave 98, is a faithful reproduction of the potential represented by wave 87, but the pedestal 99 of the pulses corresponds to a potential of about +100 volts. The pulses 98 are applied on a double triode or a couple of triodes 100 constituting a Schmidt trigger. The left plate 101 of said trigger delivers therefore a set of negative normalized or calibrated pulses 102 and the right plate 103 thereof delivers a set of positive normalized or calibrated pulses 104.

Pulses 104 are applied, through an assembly comprising a condenser 105 and a resistor 106 and having a high time constant, to the grid 107 of tube 108 which delivers a voltage on its anode 111 only when a slot or transparent zone 40 passes in front of cell 52 (the tube 108 works then above its cut-off voltage); tube 108 is loaded by a resistor 109 of high resistance and a condenser 110. The potential of anode 111 of tube 108 is represented by wave 112 comprising, for each cycle, small saw-teeth 113 (corresponding to the passage of opaque zones 56 in front of cell 52) surrounding a large saw-tooth 114 corresponding to the passage of the blank zone 39 in front of cell 52.

Potential 112 is applied to the left grid 115 of a double triode or a couple of triodes 116 constituting a Schmidt trigger. The potential of grid 115 exceeds the critical voltage ensuring the triggering of said trigger 116 only once for each revolution of disk 37, i. e. at the passage of neutral zone 39 thereof in front of cell 52 (large saw-tooth 114 of the voltage 112). The voltage of left anode 117 of trigger 116 has therefore the shape represented by wave 118 and comprises, for each cycle, a negative front 119 corresponding, by design of the tubes 108 and 116, approximately to the center 120 of increasing portion of tooth 114 (said negative front corresponds roughly to the center 94 of zone 92 of wave A and therefore roughly to the passage of the center of neutral zone 39 of disk 37 in front of cell 52). It is this negative front 119 which will be used for controlling the unblocking means for the transmission of the photo-electric signals, said unblocking means comprising essentially a double triode or a pair of triodes 121 constituting an Eccles-Jordan trigger. Trigger 121 has two stable positions corresponding either to a conductive condition of the left tube thereof (shaded on Fig. 5) or to a conductive condition of the right tube thereof (not shaded on Fig. 5). The negative front 119 of the voltage 118 which is transmitted through the diode 122 to the trigger 121 forces the left tube of this trigger to become conductive. On the other hand, the "magnetic" pulse (represented by the wave 73 of Fig. 3, and the wave B of Fig. 6) which comes in over the wire 90 and passes through the diode 123 forces the right tube of the trigger 121 to become conductive, simultaneously blocking the left tube, at the moment the coils 47 pass by the magnet 23.

The voltage of left plate 124 of trigger 121 is applied, through aperiodic divider 125, to point 126. The variation of the potential of said point 126 in course of time is represented by wave C of Fig. 6.

On the other hand triode 127 inverts the polarity and normalizes the amplitude of pulses 102; the anode 133 of said triode 127 delivers a set of calibrated pulses 128, the pedestal 129 and peaks 130 of said pulses 128 corresponding to perfectly well determined voltages (e. g. +20 volts and +90 volts respectively, whereas the voltages of point 126 are e. g. of +60 volts for the open circuit and +120 volts for the closed circuit).

When the voltage represented by curve C is at its most positive potential 131 (120 volts for example) corresponding to a conductive condition of the right tube (not shaded) of trigger 121, i. e. after the passage of a "magnetic" pulse 93 (wave C of Fig. 6), the pulses 128 do not pass through the left portion of a double triode or pair of triodes 132, the anode 133 of tube 127 being connected to the left grid 134 of assembly 132.

On the contrary at the passage of blank zone 39 in front of photo-electric cell 52 i. e. at the delivery of front 119 in the Eccles-Jordan trigger 121, the conduction of the left tube of said trigger 121 lowers the potential of wave C (Fig. 6) and brings it on the level 135 to such a value (for example 60 volts) that the pulses 128 cause the left portion of assembly 132 to become conductive and therefore, pulses represented by wave D of Fig. 6 appear at 136. It is to be noted that pulses will exist in 136 (corresponding to the photo-electric pulses 91) only during the interval separating the passage of blank zone 39 in front of cell 52 and the passage of coils 47 in front of magnet 23.

In brief the selector 89 works as follows: it receives voltage A by lead 88 and voltage B by lead 90, wave A including as many pulses 91 for each revolution of disk 37 as there are slots or transparent zones 40 on said disk and wave B comprising a pulse 93 for each passage of coils 47 in front of magnet 23.

The Eccles-Jordan trigger 121 unblocks the transmission or amplification of pulses 91 at the passage of the centers 92 of blank zones 94 (unblocking at 137) and blocks said transmission or amplification at 138, i. e. at the arrival therein of pulses 93. Therefore it is possible to obtain at 136 (wave D) the number of pulses 91 (of photo-electrical origin) comprised between the passage of the blank zone 39 in front of cell 52 and the passage of coils 47 in front of magnet 23, i. e. the number of pulses 91 equal to the number of graduations of which the pointer 16 has moved from its rest position (graduation "0"). An electronic reading or computation is thereby made of the indication of pointer 16 in front of graduated dial 18, such a reading being performed for each revolution of disk 37 (for example 5 times per second).

Pulses 91 are applied from point 136, through lead 139, to a set of counters represented as a block 140, as any electronic counting device, which integrates or totalizes the pulses 91 of curve D over a period of time, may be used. The set 140 of counters includes also a divider taking account of the fact that a certain number of measurements are performed during the interval necessary for a point on the belting to advance a length a (the length of the weighing section). For example, if a point on the belting 4 needs one second to advance the distance a and if eight "readings" are performed at each second, i. e. if disk 37 performs eight revolutions per second, a divider by eight may be provided in the set of counters 140; the output of the set 140 using lead 141 is then the eighth of the cumulated pulses i. e. exactly (save in the mechanical tare) the weight supported by the frame 1. Lead 141 is connected at its other end to the winding of an electro-magnet 142 cooperating with an armature 143 controlling a step-by-step device comprising essentially a ratchet wheel 144 and a ratchet 145 driven in the direction of arrow F' by the attraction of armature 143 due to the excitation of electro-magnet 142 and in the direction opposite to arrow F' by a return spring 146 secured in 147 on armature 143 and in 148 on a stationary axis 149.

If no complementary taring were provided in the manner hereinafter described, the ratchet wheel 144 would be directly keyed on shaft 150 of final counter 151, said shaft 150 being integral in rotation with a pointer 152 cooperating with a graduated dial 153 comprising e. g.

one hundred graduations 154 (0, 10, 20 . . . 990), two graduations corresponding to a tooth of ratchet wheel 144. On dial 153 it would be possible then to read the integrated sum (save in the complementary tare) of the output of the conveyor belting 4 over a period of time, each zone between two graduation marks corresponding e. g. to 10 pounds. A carrying-forward device, comprising a conventional revolution-counter or motometer 155, may be provided, said device indicating the number of thousand pounds conveyed by belting 4, i. e. the number of revolutions of pointer 152. The reading of the figures from motometer 155 and from dial 153 allows a precise determination of the output of the conveyor belting 4 save in the complementary tare that will be now described.

In Fig. 8 the density of belting 4 (e. g. the weight in pounds of a length of belting $dx=1$ inch) is plotted against the length of said belting from a reference line (curve 156). As belting 4 constitutes a closed curved surface, curve 156 is a periodical curve having a period $L$ equal to the length of the unrolled or displayed belting. The density of the conveyor belting varies somewhat on both sides of the average density represented by line 157.

According to a feature of the invention, the taring of a portion of the weight of belting 4 is performed mechanically i. e. by providing an adjustable tare on the scale proper (on indicating head 17 thereof). By mechanical taring is subtracted a constant weight of belting always less than the weight of the weighed portion 3 of said belting carried by frame 1. The mechanical tare is equal to the product $a \cdot h$, $a$ being as explained hereinabove the length of the weighing section 3 and $h$ being a density lower than the minimum density $h'$ of belting 4 in order to prevent pointer 16 from swinging below "0" graduation of dial 18 when the belting 4 travels unloaded.

The complementary taring corresponding to the fraction comprised between density $h$ (mechanically tared) and density $h''$ (mean or average density of the belting) is accomplished electrically. For this purpose, it is necessary to rotate shaft 150 on which is keyed pointer 152 in the opposite direction to that in which ratchet wheel 144 turns, this rotation in the opposite direction being proportional to the advancement of conveyor belting 4. For this purpose, a second step-by-step device is provided, said device comprising a ratchet wheel 158 and a ratchet 159, said ratchet being secured to an armature 160. Armature 160 is biased by a spring 163, secured at 164 to armature 160 and at 165 to a stationary axis 166, and is attracted against the biasing spring 163 by the excitation of an electro-magnet 161 receiving pulses by lead 162.

In order to control the rotation in two opposite directions of shaft 150 and therefore of pointer 152, ratchet wheel 158 is keyed on a sleeve 167 on which is secured a bevel gear 168 and ratchet wheel 144 is keyed on a sleeve 169 on which is secured a bevel gear 170. Bevel gears 168 and 170 constitute with planetary gears 171 (a single gear 171 is visible on Fig. 7) a differential; shaft 172 of planetary gears 171 rotates with shaft 150 which passes through sleeves 167 and 169. (In Fig. 7 bearings of shaft 150 and of sleeves 167 and 169 are not shown.)

Taring pulses are applied to electro-magnet 161 by lead 162 each time that belting 4 has advanced a determined distance $s$ such that the product $a \cdot s$ is equal to the value of a graduation of dial 154, i. e. 10 pounds in the chosen example. For this purpose toothed wheel 28 of driving shaft 27 meshes with toothed wheel 173 keyed on a shaft 174 carrying a cam 175 which closes, once for each revolution, an electrical circuit between contacts 176. The ratio between toothed wheels 173 and 28 is chosen in order that cam 175 just ends a complete revolution, i. e. closes the electrical circuit between contacts 176, when the product $a \cdot s$ has attained the aforementioned value (i. e. 10 pounds in the chosen example).

Leads 177 end in the calculating set of counters 140 wherein a pulse is delivered each time that the contacts 176 are pressed one against the other by the rotation of cam 175. This calculating set delivers a pulse by lead 162 to electromagnet 161 for each closure of contacts 176 thereby ensuring the complementary taring.

In a modification, the complementary taring may be performed in a somewhat different manner by utilizing the electric pulses delivered by the right anode 178 of trigger 116; indeed a pulse is generated on this anode 178 for each passage of blank zone 39 in front of photoelectric cell 52 and arm 46, and for each revolution of disk 37, i. e. also for a constant advancement of conveyor belting 4. This is because disk 37 and arm 46 rotate at a speed proportional to the rotation speed of toothedwheel 28 since both are carried on shaft 34 and this shaft and shaft 30, which carries the pinion 28 are driven at the same speed by selsyn motors 31 and 32. It is therefore possible to transmit to electro-magnet 161 by lead 161 the electrical pulses generated on anode 178, and secure the same effect as if these pulses were derived from the closing of the contacts 176, thereby producing a correct taring. This may be done by inserting an electronic frequency divider in circuit between the anode 178 and the electro-magnet 161 to electronically reduce the frequency of the pulses in the same ratio in which their frequency is mechanically reduced by the cooperating pinions 28 and 173 in the embodiment of Figure 1.

Frequency multiplying or dividing circuits suitable for this purpose are well known in the art.

It was explained that the taring is accomplished in two operations, i. e. a mechanical taring corresponding to an arbitrary density $h$ (carried out minimum density $h'$ of belting 4) and realized in the scale proper and a complementary taring corresponding to the difference between the average density $h''$ of belting 4 and the arbitrary density $h$ and realized in the final counter 151 by means of a couple of step-by-step motors controlling in opposite directions, through a differential, the rotation of shaft 150 and pointer 152 of said final counter 151. A very precise taring is obtained by such a construction.

In practice the complementary taring is set first once for all and, before each series of measures, the belting 4 is driven into rotation by roller 7 without any load on said belting and the mechanical tare is adjusted so that, after many complete revolutions of belting 4, pointer 152 remains in front of the "0" graduation of dial 153. The essential advantage of the complementary taring according to the invention is that it allows a "null" integration on empty belting 4 in spite of the variations of density of the belting.

The invention in its broader aspects is not limited to the specific embodiment described and shown on the drawings, but departures may be made therefrom within the scope of the accompanying claims without departing from the principles of the invention and without sacrificing its chief advantages.

It would also be possible, in another modification of the invention, to substitute for the magnet 23 a pair of illuminating devices i. e. a first illuminating device disposed in the plane of pointer 16 and a second illuminating device disposed in the plane of the "0" or reference graduation of scale 18, a photo-electric cell being substituted for coils 47, this cell generating electrical pulses each time that it passes, during its rotation, in front of one of the illuminating devices, the control of the unblocking and blocking means of the amplification or transmission of the pulses generated by photo-electric cell 52 being effectuated by the passage of the cell, which is a substitute for coils 47 respectively, in front of the second and first illuminating devices.

It would, of course, also be possible to simply substitute a single illuminating device 201 for the magnet or magnets, and a photoelectric cell 205 for the coils 47. This modification is illustrated in Figure 9 in which the illuminating device 201 is fed by the wires 202 and mounted in a box 203 carried by the arm 22. There is a slit 204 in the box and every time the photoelectric cell 205 carried by the member 46 passes in front of the slit, it initiates a pulse in the circuit which includes the wires 48 and the transformer coil 41. The rest of the apparatus remains exactly as described in connection with Figures 1 and 2.

What we claim is:

1. Integrating scale for weighing precisely the output of a conveyor belting, driven at a substantially constant linear speed and resting on a set of rollers, by weighing at very short intervals a portion of said belting, said integrating scale comprising: at least one weighing roller on which travels said portion of said belting, said at least one roller being free to undergo a vertical displacement and being connected, by a series of fulcrumed levers to the beam of said scale; an indicating head including a graduated dial comprising $n$ equidistant graduations and a blank zone without graduations embracing an angle of $m$ degrees, a pointer controlled in angular position around a shaft by said beam, the angular position of said pointer relative to said dial being a direct function of said vertical displacement of said at least one roller, and a member rotating with said pointer; a mechanism continuously rotating around an axis coaxial with said shaft and including an arm carrying means for generating an electrical signal at each passage of said arm in front of said member, a transformer having its primary winding connected to said mechanism to receive said signal and having a stationary secondary winding, and a disk which is a negative reproduction of said dial and comprises $n$ equidistant photon-permeable zones and a photon-opaque neutral zone embracing an angle of $m$ degrees; means for driving said rotating mechanism at a speed proportional to said substantially constant linear speed; means disposed on each side of said disk for counting the number of said photon-permeable zones of said disk between the passage of said photon-opaque zone thereof in front of said last mentioned means and the passage of said means for generating an electrical signal in front of said member; means for integrating the successive countings of said number of zones over a period of time; taring means for subtracting from each indication of said pointer a constant value corresponding to a unitary weight of said belting less than the minimum unitary weight of said belting multiplied by the length of said portion of said belting; and additional taring means for subtracting from the integrated countings the difference between the mean weight of the weighed belting and the already subtracted fraction of weight thereof.

2. Integrating scale according to claim 1, wherein said member is constituted by a magnet and said first mentioned means for generating an electric signal comprises at least one coil wherein is generated an electrical signal at each passage of said at least one coil in front of said magnet.

3. Integrating scale according to claim 1, wherein said member is constituted by a directed source of photons and said first mentioned means for generating an electric signal comprise a photon-sensitive element generating a signal at each passage of said photon-sensitive element in front of said directed source of photons.

4. Integrating scale according to claim 1, wherein said means for driving said rotating mechanism comprise a couple of synchronized motors: a first motor driven into rotation by one of said rollers in said set, and a second motor driving said mechanism.

5. Integrating scale according to claim 1, wherein said means disposed on each side of said disk comprise a directed source of photons and a photon-sensitive element generating electrical signals at each photon reception, disposed on each side of said disk.

6. Integrating device according to claim 5 wherein said electrical signals generated by said photon-sensitive element from said means disposed on each side of said disk are applied to a first amplifier which generates a series of $n$ calibrated pulses followed by an interval without pulses for each revolution of said disk.

7. Integrating device according to claim 6 wherein said calibrated pulses generated by said first amplifier are applied to a second amplifier controlled by unlocking and locking means ensuring the unlocking of said second amplifier when said last mentioned means receives said interval without pulses and the locking of said second amplifier when said last mentioned means receives a calibrated pulse from said electronic device.

8. Integrating device according to claim 7, wherein said unlocking and locking means comprise first trigger means including two electronic portions: a first portion receiving calibrated pulses from said electronic device and a second portion receiving pulses generated in second trigger means at the application thereto of said interval without pulses.

9. Integrating scale according to claim 8 wherein said first trigger means comprise an Eccles-Jordan trigger and said second trigger means comprise a Schmidt trigger and an electron tube receiving the output of said first amplifier and delivering in said Schmidt trigger, said electron tube transforming said interval without pulses in a pulse of great amplitude controlling the triggering of said Eccles-Jordan trigger.

10. Integrating scale according to claim 7, wherein the control of the unlocking means of said second amplifier is realized by the signals generated by said first mentioned means at their passages in front of a second stationary member disposed in the plane of the reference graduation of said dial.

11. Integrating scale according to claim 7, wherein the output of said second amplifier, comprising for each revolution of said disk a number of pulses equal to the number of graduations of which has moved said pointer from the reference position thereof, is applied to a set of electronic counters.

12. Integrating scale according to claim 11, wherein said set of electronic counters comprises a divider.

13. Integrating scale according to claim 11, in which said last mentioned taring means is a final counter comprising a revolution counter driven in a first direction by a first step-by-step motor controlled by said set of electronic counters and in a second direction by a second step-by-step motor receiving taring pulses, the number of said taring pulses being proportional to the advancement of said belting.

14. Integrating scale according to claim 13 further comprising a cam-member driven into rotation by one of said rollers in said set at a rotation speed proportional to the rotation speed of said one of said rollers, said cam-member closing an electrical circuit controlling said second step-by-step motor.

15. Integrating scale according to claim 13, wherein said taring pulses are picked up from said Schmidt trigger.

16. Integrating scale according to claim 1, wherein said electrical signal generated by said first mentioned means are sent into an electronic device, including differentiating means, amplifying means and over-driven amplifying means, said electronic device generating a calibrated pulse for each passage of said first mentioned means in front of said member.

17. Integrating scale means according to claim 1 wherein said first mentioned taring means is mechanical in construction and said last mentioned taring means is electrically actuated.

18. Integrating means for precisely computing the load delivered by a conveyor belt driven at a substantially constant linear speed and equipped with a scale which has a movable weight-responsive beam and constantly weighs a portion of said belt and its load, said integrating means comprising a pivotally mounted member connected to said beam so that its angular position is dependent upon the weight of said weighing portion of said belt and its load at any given instant, a mechanism continuously rotating about an axis coaxial with that of said pivotally mounted member and including an arm carrying means for generating an electrical signal at each passage of said arm in front of said pivotally mounted member, a transformer having a rotatable primary winding turning with said arm and connected to receive said signal and a fixed secondary winding, a dial provided with a graduated zone having an equidistant photon-permeable indicia and a blank photon-opaque zone without indicia embracing an angle of $m$ degrees, means for driving said rotating mechanism at a speed proportional to that of said conveyor belt, fixed photon-responsive means disposed adjacent said disc for generating an electric current each time one of said photon-permeable indicia passes thereby, electronic counting means connected to said photon-responsive means and said fixed secondary for counting the number of said photon-permeable indicia on said disc which pass said counting means between the passage of said photon-opaque zone in front of said photon-responsive means and the passage of said first mentioned means for generating an electrical signal in front of said pivotally mounted member, means for integrating the successive numbers counted over a period of time, and taring means for subtracting from said numbers a figure corresponding to the actual weight of the weighed portion of the belt.

References Cited in the file of this patent

UNITED STATES PATENTS

| | | |
|---|---|---|
| 2,110,746 | Tolson | Mar. 8, 1938 |
| 2,285,719 | Jerome | June 9, 1942 |
| 2,680,241 | Gridley | June 1, 1954 |

FOREIGN PATENTS

| | | |
|---|---|---|
| 595,871 | Germany | Apr. 23, 1934 |